United States Patent [19]
Pawlowski et al.

[11] Patent Number: 5,784,579
[45] Date of Patent: Jul. 21, 1998

[54] METHOD AND APPARATUS FOR DYNAMICALLY CONTROLLING BUS ACCESS FROM A BUS AGENT BASED ON BUS PIPELINE DEPTH

[75] Inventors: Stephen S. Pawlowski, Beaverton; Nitin V. Sarangdhar, Portland; Michael W. Rhodehamel; Matthew A. Fisch, both of Beaverton; Peter D. MacWilliams, Aloha, all of Oreg.

[73] Assignee: Intel Corporation, Santa Clara, Calif.

[21] Appl. No.: 709,214

[22] Filed: Sep. 6, 1996

Related U.S. Application Data

[63] Continuation-in-part of Ser. No. 645,836, May 14, 1996, abandoned, which is a continuation of Ser. No. 206,093, Mar. 1, 1994, Pat. No. 5,548,733.

[51] Int. Cl.$^6$ .............................. G06F 13/38; G06F 13/40
[52] U.S. Cl. ........................... 395/286; 395/306; 395/670
[58] Field of Search ...................................... 395/670–672, 395/286, 285, 309, 306

[56] References Cited

U.S. PATENT DOCUMENTS

| | | | |
|---|---|---|---|
| 4,229,790 | 10/1980 | Gilliland et al. | 395/800 |
| 4,412,286 | 10/1983 | O'Dowd et al. | 395/309 |
| 4,480,307 | 10/1984 | Budde et al. | 395/280 |
| 5,006,982 | 4/1991 | Ebersole et al. | 395/736 |
| 5,019,967 | 5/1991 | Wheeler et al. | 395/395 |
| 5,125,084 | 6/1992 | Begun et al. | 395/800 |
| 5,193,179 | 3/1993 | Laprade et al. | 395/184.01 |
| 5,313,467 | 5/1994 | Varghese et al. | 370/468 |
| 5,369,775 | 11/1994 | Yamasaki et al. | 395/800 |

OTHER PUBLICATIONS

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

*Primary Examiner*—Gopal C. Ray
*Attorney, Agent, or Firm*—Blakely, Sokoloff, Taylor & Zafman

[57] ABSTRACT

A dynamic pipeline depth control method and apparatus is used with a bus which supports pipelined bus transactions. An agent coupled to the bus includes both a transmitter and a receiver. The transmitter is used to transmit an indication to the other agents coupled to the bus which prevents the other agents from issuing a transaction on the bus. The receiver is used to receive the indication, from another agent, that prevents the agent from issuing a transaction on the bus.

11 Claims, 5 Drawing Sheets

METHOD AND APPARATUS FOR DYNAMICALLY CONTROLLING BUS ACCESS FROM A BUS AGENT BASED ON BUS PIPELINE DEPTH

RELATED APPLICATIONS

This application is a continuation-in-part of U.S. patent application Ser. No. 08/645,836, filed May 14, 1996, now abandoned, which is a continuation of U.S. patent application Ser. No. 08/206,093, filed Mar. 1, 1994, now U.S. Pat. No. 5,548,733.

This application is related to U.S. patent application Ser. No. 08/206,091, entitled, "Method and Apparatus for Transmitting Information on a Wired-OR Bus", filed Mar. 1, 1994, now U.S. Pat. No. 5,659,689, which is incorporated by reference herein.

BACKGROUND OF THE INVENTION

1. Field of the Invention

The invention generally relates to computer systems and in particular relates to pipelined bus systems for use in interconnecting devices within a computer system.

2. Background

Many state of the art bus systems are pipelined to allow for multiple bus transactions to be processed concurrently. For example, bus arbitration may be performed for one transaction while data transfer is performed concurrently for a separate bus transaction. In this manner, although only a single phase of a single bus transaction can be processed at any given clock cycle, multiple transactions can nevertheless be processed in parallel with different phases of the separate bus transactions performed concurrently. The number of transactions which are being processed in parallel at a particular time is referred to as the depth of the bus pipeline at that time.

A problem can occur with pipelined busses if each of the devices or agents connected to the bus is not capable of accommodating the maximum depth of the bus pipeline. For example, if one particular agent is only capable of accommodating a pipeline having a depth of two, then the overall bus system may not function properly if other agents are attempting to pipeline transactions up to a greater pipeline depth. The effective maximum depth for a bus pipeline is constrained by the agent which can accommodate only the shallowest bus pipeline depth. The bus depth to which any particular agent is capable of accommodating may depend on the particular hardware of the bus agent or it may depend upon the current state of the bus agent. For example, during start-up or initialization of an agent, the agent may not be capable of processing any bus transactions, whereas once the agent has been fully activated, the agent may be capable of accommodating a bus pipeline depth of five. In other cases, the maximum depth to which an agent can process bus request is a dynamic function of the current state of input and output queues connected to the bus. For example, if the input queue of a bus agent is empty, the agent may be capable of accommodating a pipeline depth of five. However, if the queue of the bus agent is full or nearly full, the agent may only be capable of accommodating a bus pipeline depth of one or two.

It would be desirable to provide a bus mechanism to allow the overall depth of the bus pipeline to be dynamically varied in accordance with any particular constraints of the agents connected to the bus. One solution is to provide a central arbiter which controls the depth of the pipeline. In such a system, each individual bus agent transmits a signal to the central arbiter that specifies the maximum pipeline depth that the agent can accommodate. The arbiter then controls the depth of the pipeline in accordance with the signals received from each of the various bus agents. Although such a system is feasible, it is not necessarily an ideal system since the need for each agent to transmit signals to a central arbiter renders the responsiveness to changing pipeline depth requirements somewhat sluggish and may result in circumstances where multiple bus transactions are issued before the central arbiter has a chance to recognize and respond to a pipeline depth reduction request received from one of the agents. Such may necessitate re-transmission of bus transactions, resulting in overall bus inefficiency or, under certain circumstances, could result in the loss of data. In any case, it would be desirable to provide a more effective method for dynamically controlling the depth of the bus pipeline.

SUMMARY OF THE INVENTION

A dynamic pipeline depth control method and apparatus is described herein. An agent configured in accordance with the present invention is coupled to a bus which supports pipelined bus transactions. The agent includes both a transmitter and a receiver. The transmitter is used to transmit an indication to the other agents coupled to the bus which prevents the other agents from issuing a transaction on the bus. The receiver is used to receive the indication, from another agent, that prevents the agent from issuing a transaction on the bus.

According to one embodiment of the present invention, each agent tracks how close the current depth of the bus pipeline is to the maximum permissible pipeline depth supported by the agent. If the current depth becomes too close to the maximum permissible depth, then the agent sends a signal to the other agents on the bus indicating that they are not to issue a new transaction on the bus.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Referring to FIGS. 1–6, preferred embodiments of the invention will now be described. Within these descriptions, certain specific details of exemplary embodiments of the invention will be set forth. However, in many cases, embodiments may be configured without the specific details in accordance with the principles of the invention.

Figure 1:
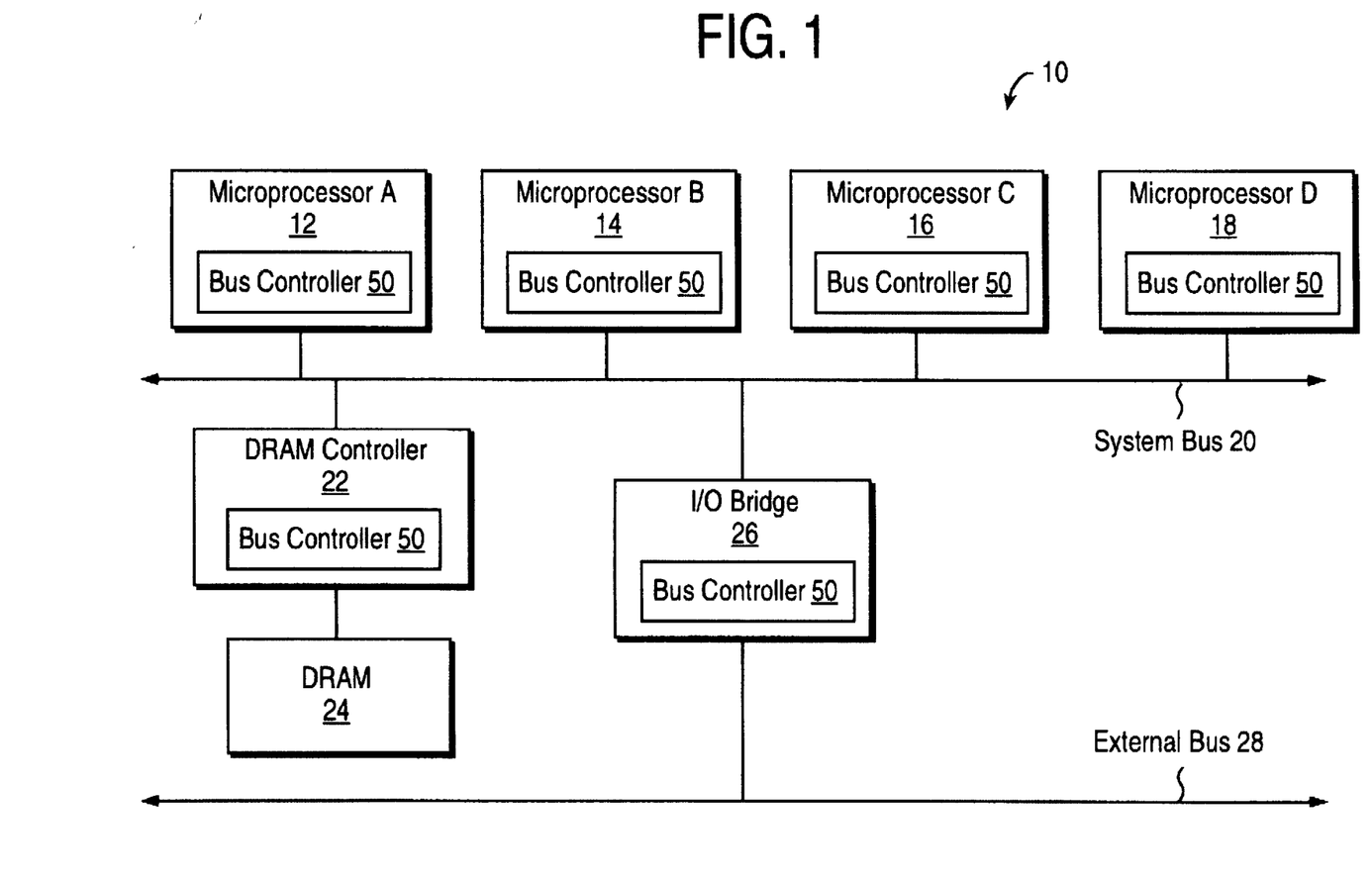
FIG. 1 is a block diagram of a computer system such as may be used with one embodiment of the present invention.

FIG. 1 illustrates a block diagram of a computer system such as may be used with one embodiment of the present invention. Computer system 10 includes a set of four microprocessors 12, 14, 16 and 18, each connected to a system or CPU bus 20. Additional devices are also connected to the system bus including a Dynamic Random Access Memory (DRAM) controller 22 which is in turn connected to a DRAM 24. An input/output (I/O) bridge 26 is also connected to system bus 20. I/O bridge 26 interconnects system bus 20 to an external bus 28 which may be, for example, a Peripheral Component Interconnect (PCI) bus or an Extended Industry Standard Architecture (EISA) bus. Peripheral devices (not shown), such as printers, modems, and the like, may be connected via external bus 28.

Each of microprocessors 12–18, DRAM controller 22, and I/O bridge 26 represents a bus agent connected to system bus 20. Additional bus agents, not shown, may also be connected to system bus 20. In one embodiment, a total of eight agents may be simultaneously connected to system bus 20. The total number of agents which can be connected to system bus 20 depends, for example, upon the electrical characteristics of the system bus. In other embodiments, more or fewer bus agents may be connected directly to system bus 20. Each of microprocessors 12–18 may be identical or, depending upon the implementation, the various microprocessors may differ. In one implementation, each microprocessor is a complex instruction set computer (CISC) microprocessor configured in accordance with Intel® Architecture. In other embodiments, the microprocessors may be reduced instruction set computer (RISC) microprocessors. In other implementations, only a single microprocessor may be connected to system bus 20.

Each agent includes a bus controller 50 (described below with reference to FIG. 3.) Each bus controller is identical to bus controllers within each other agent or, at least, is configured to perform a minimum set of identical functions of the bus controllers of every other agent. Bus 20 and the various bus controllers within each bus agent collectively provide a pipelined bus system, wherein multiple bus transactions are processed simultaneously.

Figure 2:
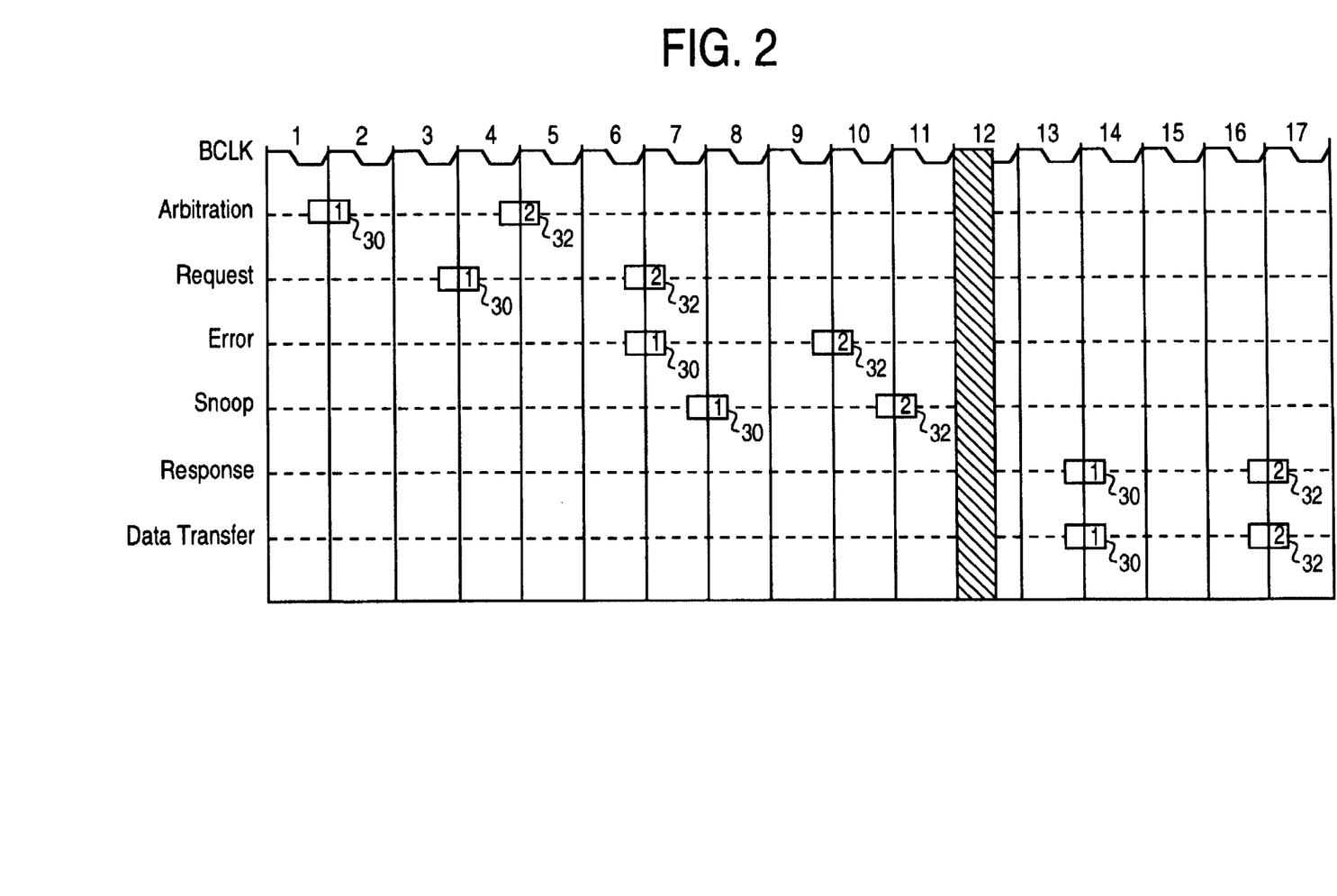
FIG. 2 illustrates a bus pipeline in accordance with one embodiment of the present invention.

FIG. 2 illustrates a bus pipeline in accordance with one embodiment of the present invention. The bus clock (BCLK) represents a bus clock with a total of seventeen clock cycles illustrated. Exemplary bus transactions 30 and 32 are also illustrated. Bus transactions 30 and 32 each include the following distinct bus phases: an arbitration phase, a request phase, an error phase, a snoop phase, a response phase, and a data transfer phase. Arbitration represents a phase wherein it is determined which of the bus agents can gain control of the bus. Any of the agents connected to system bus 20 may be configured as a bus arbitrator. The manner by which bus arbitration is performed is not pertinent to the present invention and will not be described in detail herein. The request phase represents a phase in which a request, such as a memory load, is placed on the bus. The error phase represents a phase wherein any error occurring as a result of the bus request is processed. The snoop phase represents a phase wherein data caches within the various microprocessors illustrated in FIG. 1 are snooped to determine, for example, whether any contents of the respective caches are relevant to the transaction being snooped. The response and data transfer phases are phases in which the bus transaction is satisfied, for example, by having data retrieved from memory transmitted to an agent requesting the data.

The various phases of bus transactions 30 and 32 are performed at different clock cycles. For example, the arbitration phase for transaction 30 is performed at the end of clock cycle 1. The request phase for transaction 30 is performed at the end of clock cycle 3. The error phase, the snoop phase, and the response and data transfer phases are performed at the ends of clock cycles 6, 7, 13 and 13, respectively. In FIG. 2, the band between clock cycles 11 and 12 indicates that an arbitrary number of additional clock cycles may occur before subsequent phases are executed. In other words, depending upon the particular bus transaction, there may be numerous clock cycles before the response and data transfer phases are performed. The exact number may depend upon, for example, the speed by which DRAM 24 of FIG. 1 can respond to a memory load to retrieve requested data.

Hence, the separate phases of the single bus transaction are performed sequentially in time at different clock cycles. The discrete phases of bus transaction 32 are also performed sequentially at different clock cycles, each of which is staggered in time from the corresponding phase of bus transaction 30. In the example of FIG. 2, at least three clock cycles must occur between the arbitration phase for bus transaction 30 and the arbitration phase for bus transaction 32. Other pipeline implementations may have a greater or lesser number of clock cycles between each successive phase. Numerous additional bus transactions may also be performed with, for example, the arbitration phase for a third bus transaction occurring at the end of clock cycle 7 and the arbitration phase for yet another bus transaction occurring at the end of clock cycle 10.

In general, only a single phase of any one bus transaction may be performed at each clock cycle. However, at a particular clock cycle, different phases of different transactions may be performed simultaneously. For example, at clock cycle seven, both the request phase of bus transaction 32 and the error phase of bus transaction 30 are performed simultaneously. According to one embodiment of the present invention, up to eight bus transactions can be performed simultaneously, each with a different phase or no phase being processed in any given clock cycle.

Thus, FIG. 2 illustrates an example of a pipeline for use with system bus 20. The illustrated pipeline has a maximum depth of eight. As will be discussed below, a mechanism is provided for allowing any of the agents connected to system bus 20 to limit the depth of the bus to prevent more than a particular number of transactions from being processed simultaneously. This particular number can be any number less than or equal to the maximum depth of the pipeline.

Figure 3:
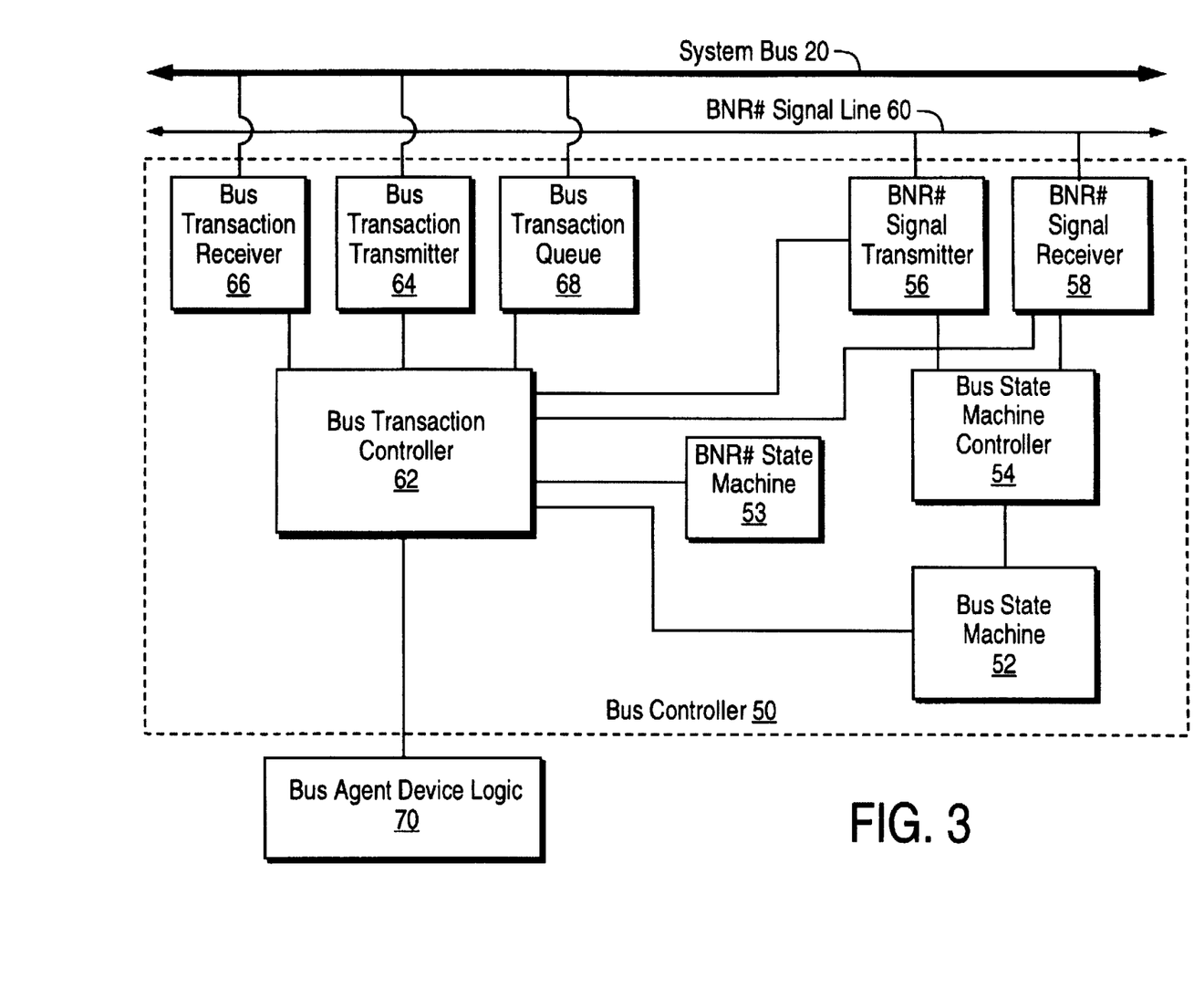
FIG. 3 is a block diagram of one agent connected to the bus of FIG. 1, particularly illustrating functional units provided within the agent for allowing the agent to dynamically control the depth of the bus pipeline according to one embodiment of the present invention.

FIG. 3 illustrates a bus controller 50 within one of the bus agents illustrated in FIG. 1. Each of the agents includes a bus controller performing at least the functions illustrated in FIG. 3. Each individual bus controller may be configured using different hardware so long as the same set of minimum functions are performed.

Before discussing the particular functions of the bus controller of FIG. 3, a brief overview of the operation of the bus controller is provided. As noted above, an important aspect of the present invention is the provision of a mechanism for allowing each agent connected to a bus to unilaterally and dynamically limit the depth of the pipeline of the bus. This is achieved, in part, by providing an indication on the bus of when to block new transactions from being placed on the bus. In one implementation, this indication is a block next request (BNR#) signal. For clarity, the BNR# signal line 60 is shown separately from all other lines within system bus 20. However, BNR# signal line 60 may be regarded as merely one line of the overall system bus 20.

In addition, a bus state machine is also provided in each agent connected to the bus which tracks the state of the bus from that agent's perspective. There are three states to the bus including a free state, a stalled state, and a throttled state. In the free state, the agent allows the depth of the pipeline of the bus to increase and allows any agent having control of the bus to dispatch as many bus transactions onto the bus as desired, up to a maximum predetermined bus depth, which, for the exemplary embodiment described herein, is eight. In the stalled state, the agent allows the current number of outstanding transactions on the bus to decrease but prevents the agent or agents having control of the bus from transmitting new bus transactions onto the bus. In the stalled state, the current number of outstanding transactions decreases with time as transactions that had already been transmitted on the bus are completed and are "drained" from the bus. In the throttled state, the agent allows one bus transaction to be issued at a maximum rate of once every four clocks. The throttled state may be used to generally maintain the pipeline of the bus at a constant depth. Such may be achieved, for example, by repeatedly returning the state machine to the throttled state each time the state machine transitions from throttled to free or stalled. The throttled state may also be used, for example, to allow one transaction on the bus and give the agent sufficient time to check whether that transaction targets the agent and would use up the last of the agent's resources (queue entries, etc.). However, the throttled state may be exploited for other purposes as well and, even if the state machine is repeatedly returned to the throttled state, the overall depth of the pipeline may increase or decrease somewhat.

In addition, a BNR# state machine 53 is also included in the bus controller of each agent. As discussed in more detail below, the BNR# state machine 53 indicates when the agent is to drive, or assert, an active BNR# signal on the bus in order to throttle or stall the bus.

It should be noted that the limitations imposed by the BNR# signal are in addition to limitations imposed by a bus arbitration system which grants control of the bus to the bus agents. Thus, only that agent, or those agents, which have already gained control of the bus via arbitration are allowed to transmit transactions onto the bus, subject to the state of thie BNR# signal. The manner by which arbitration is achieved may be performed in accordance with conventional techniques which will not be described herein.

The state of the bus is controlled or influenced by each agent by transmitting the BNR# signal to all other agents through the system bus. As will be described in more detail below, the state transitions are defined, and the BNR# signal is implemented, such that any one agent can throttle or stall the bus to thereby limit further bus transactions. The details of the state machines and the state transition signals will now be described with reference to the particular functional units illustrated in FIG. 3.

Within bus controller 50 of FIG. 3, the state of the bus is tracked by a bus state machine 52. The bus state machine 52 indicates, from the agent's perspective, whether the bus is in the free state, the throttled state or the stalled state. A bus state machine controller 54 controls bus state machine 52 to cause the state machine to transition from one state to another based on how close the bus pipeline depth is to a maximum permissible depth supported by the agent.

Bus controller 50 also includes a bus transaction controller 62, a bus transaction transmitter 64, a bus transaction receiver 66, and a bus transaction queue 68. Bus transaction receiver 66 receives information regarding bus transactions pending on bus 20. The information is processed by transaction controller 62 and stored within a transaction queue 68. The information stored within transaction queue 68 effectively defines the current depth of the pipeline of bus 20. Bus transaction controller 62 monitors queue 68 and determines if the depth of the pipeline is reaching a depth which may exceed a currently permissible depth for the particular agent. If such is the case, transaction controller 62 controls signal transmitter 56 to transmit a BNR# signal to prevent new transactions from being placed on the bus. For example, if transaction controller 62 determines that the pipeline depth is in danger of exceeding the agent's current capacity and that the depth must be prevented from increasing, controller 62 controls signal transmitter 56 to transmit a BNR# signal in subsequent clock cycle(s) preventing further bus transactions from being issued to the bus and ultimately resulting in a decrease in the depth of the pipeline as previously issued transactions are completed.

Additionally, controller 62 also controls bus state machine controller 52 to transition to either the stalled or throttled state. Which of these states is transitioned to is dependent on how close the pipeline depth is to the maximum permissible depth for the agent.

A determination of whether the pipeline has met a maximum permissible depth for the particular agent is made by transaction controller 62 based on information received from internal device logic 70 of the agent and transaction queue 68. Such may occur as a result of internal queues within device logic 70 becoming full or as a result of device logic 70 switching to a state, such as a power-up state, wherein input bus transactions cannot be processed, or on transaction queue 68 becoming full.

In the event that the particular agent illustrated in FIG. 3 has control of the bus and wishes to transmit a bus transaction via transaction transmitter 64, transaction controller 62 queries the receiver 58. If the receiver 58 samples an active BNR# signal 60, then transaction controller 62 controls transmitter 64 to prevent a transaction from being transmitted onto bus 20. However, if the receiver samples an inactive BNR# signal 60, then transaction controller 62 controls transaction transmitter 64 to transmit a bus transaction. As discussed above, transactions are transmitted by transmitter 64 only if the agent has current control of the bus as a result of previous arbitration.

Controller 62 controls transmitter 56 to drive the BNR# signal 60. The timing of driving the BNR# signal on line 60 is dependent on the state of the bus, as shown in Table I below. This timing is controlled by the BNR# state machine 53. The address strobe (ADS#) signal identified in Table I is asserted by an agent in the request phase of a transaction to indicate that a valid address has been placed on the bus.

TABLE I

| Bus State | BNR# driven |
|---|---|
| Free | In the third clock cycle after ADS# is asserted. |
| Throttled | Three clock cycles after last BNR# transition from active to inactive. |
| Stalled | Every other clock cycle. |

Figure 4:
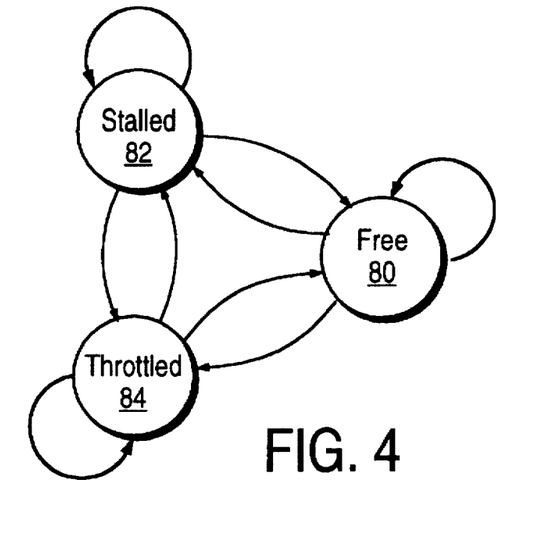
FIG. 4 is a state diagram illustrating the state transitions occurring within a bus state machine provided within the bus agent of FIG. 3 according to one embodiment of the present invention.

Referring to FIG. 4, the particular state transitions between the free, stalled and throttled states will now be described. In FIG. 4, the free, stalled and throttled states are identified by reference numerals 80, 82 and 84, respectively.

As illustrated, a transition can be made from any one of the states to any other of the states.

Whether a state transition occurs in an agent, and which transition occurs, depends on the current depth of the bus pipeline and the maximum depth supported by that agent. If the pipeline has met a maximum permissible depth for the agent, then the agent transitions to stalled state. If the pipeline is at a depth close to a maximum permissible depth for the agent, such as one or two transactions away, then the agent transitions to throttled state.

Additionally, the controller 62 also controls the bus state machine 52 to determine when to control transmitter 56 to assert or deassert the BNR# signal 60. The state of the bus state machine 52, in conjunction with how close the pipeline is to the maximum permissible depth for the agent, indicates when the BNR# signal 60 needs to be asserted.

Figure 5:
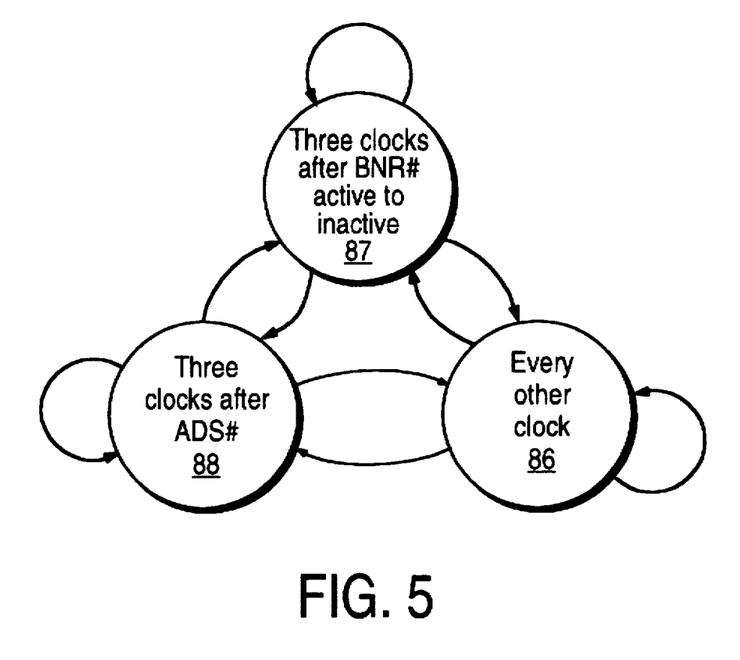
FIG. 5 is a state diagram illustrating the state transitions occurring within a sampling state machine provided within the bus agent of FIG. 3 according to one embodiment of the present invention.

How frequently the BNR# signal is to be driven is determined by the BNR# state machine 53, as illustrated in FIG. 5. As illustrated, the BNR# state machine has three states: a drive every other clock signal state 86, a drive three clocks after BNR# active to inactive state 87, and a drive three clocks after ADS# state 88. The BNR# state machine transitions between the three states based on the state of the bus. If the bus is in the free state, then the BNR# state machine stays in the three clocks after ADS# state 88. If the bus is in the throttled state, then the BNR# state machine stays in the three clocks after BNR# active to inactive state 87. If the bus is in the stalled state, then the BNR# state machine stays in the every other clock state 86. A transition to another bus state causes the BNR# state machine 53 to transition to the state corresponding to that bus state.

According to one embodiment of the present invention, if an agent is not actively driving the BNR# signal 60 then the agent is sampling it via receiver 58 discussed above. In this embodiment, a new transaction can be placed on the bus every three clock cycles along with the corresponding ADS# assertion, subject to the BNR# signal 60. Thus, an agent which has gained control of the bus through arbitration will place a new transaction on the bus three clocks after the last assertion of ADS#, assuming the BNR# signal 60 was not sampled active. However, if the BNR# signal 60 was sampled active, then the agent places a new transaction on the bus in the clock cycle following the BNR# signal 60 being sampled inactive. Also in this embodiment, an agent which wishes to issue a request on the bus evaluates the sampled value of the BNR# signal 60 in the clock cycle preceding the cycle in which that agent wishes to enter the request phase of the transaction.

The system preferably employs a wired-OR logic with a low signal level representing an active signal and a high signal representing an inactive signal, such that each agent can unilaterally force an active low BNR# signal 60 in order to inhibit requests.

In the illustrated embodiment, an agent can transition from the stalled state directly to the free state. In this embodiment, an agent which has, for example, multiple entries become available in a queue can transition directly to the free state. This alters when the agent will assert the BNR# signal, if at all, as discussed above with reference to Table I. Alternatively, transitioning limitations could be imposed on the agents, such as requiring the agents to transition from the stalled state to the free state through the throttled state.

In an alternate embodiment of the present invention, the agents do not include a throttled state. In this alternate embodiment, the agents simply transition between the free and stalled states.

Figure 6:
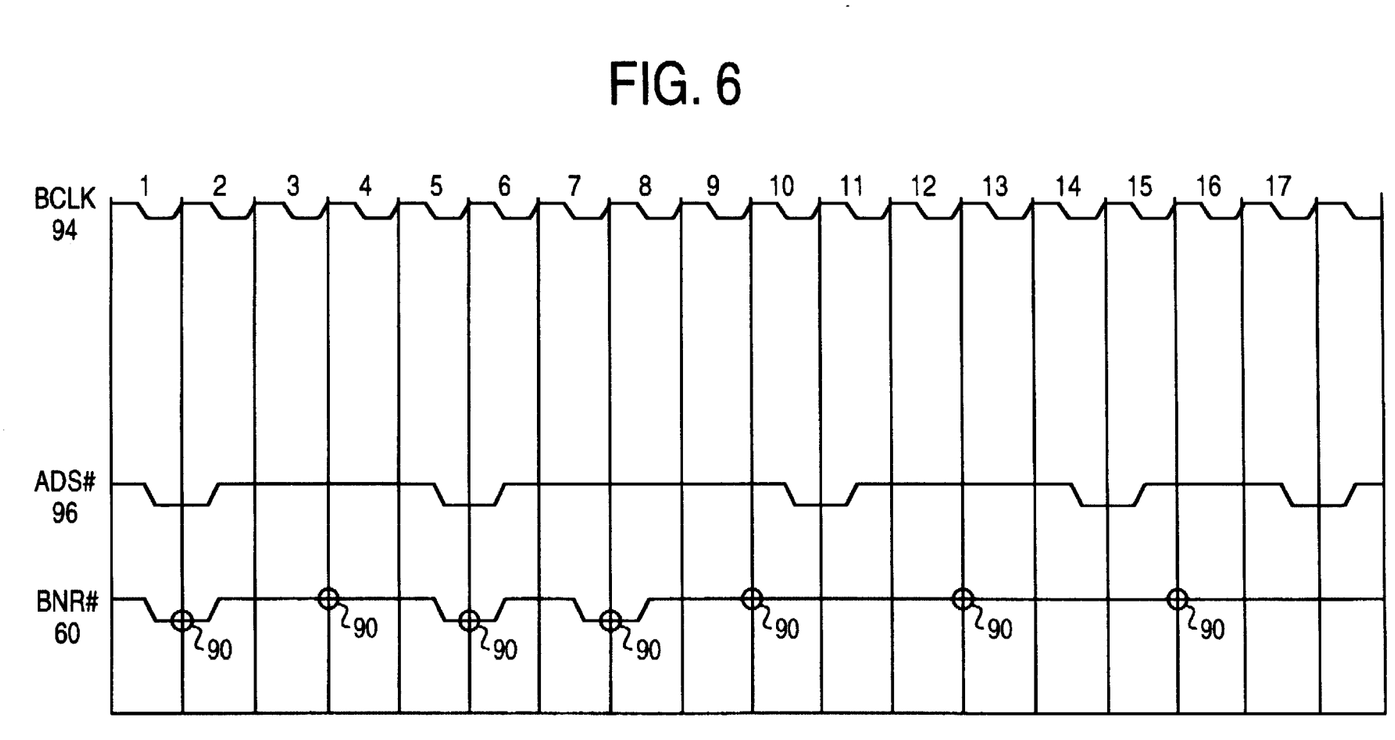
FIG. 6 is a timing diagram illustrating an exemplary sequence of selected signals on a bus in accordance with one embodiment of the present invention.

FIG. 6 illustrates a timing diagram of an exemplary sequence of signals. Circles 90 identify sampling points at which the sampled BNR# signal affects whether an agent will issue a request on the bus. As can be seen, the sampling points do not necessarily occur at every clock cycle, but can occur at every second or third clock cycle.

As noted, in the currently preferred implementation the number of clock cycles between each sampling point is either two or three. The duration between sampling points has been selected to eliminate a wired-OR glitch problem which can occur in transmission systems employing wired-OR logic. The details of the selection of the sampling points are provided in the co-pending application identified above. However, it should be noted that those details are not pertinent to the present invention, and a wide variety of implementations may be developed using different criteria for the sampling points. Indeed, if some other form of logic, rather than wired-OR logic is employed, then a different granularity of sampling points may be necessary or desirable. In certain implementations it may be desirable to sample the state transition signal at each clock cycle. However, in the exemplary implementation, since new bus transactions can only be output at least three clock cycles apart, the sampling of the transition signals at every two or three clock cycles is sufficient to adequately sample the state of the system and to control the depth of the pipeline.

In FIG. 6, the clock signal is identified by reference numeral 94 and an address strobe signal (ADS#), which is also an active low signal, is illustrated by reference numeral 96. The address strobe signal illustrates the assertion of a transaction onto the bus. As can be seen, transactions are issued onto the bus only in clock cycles 1, 5, 11, 14, and 17. The assertion of the BNR# signal in clock cycle 1 prevents an agent from placing a transaction on the bus in clock cycle 4, but deassertion of the BNR# signal sampled in clock cycle 4 allows a transaction on the bus in clock cycle 5. Similarly, assertion of the BNR# signal in clock cycle 5 prevents an agent from placing a transaction on the bus in clock cycle 8, and assertion of the BNR# signal in clock cycle 7 prevents an agent from placing a transaction on the bus in clock cycle 9. But, deassertion of the BNR# signal in clock cycle 9 allows an agent to place a transaction on the bus in clock cycle 11.

As illustrated in FIG. 6, the agent asserting the BNR# signal 60 transitions the bus from the throttled state to the stalled state in clock cycle 5, and remains in the stalled state until clock cycle 8, where the agent transitions the bus to the free state.

What has been described is a bus system wherein each agent connected to the bus is capable of limiting the depth of a pipeline of the bus. Although described with respect to a particular exemplary embodiment, principles of the invention may be exploited in other embodiments and employed for different applications. The exemplary implementation described herein involves a multiprocessor computer system employing one or more microprocessors configured in accordance with Intel architecture. However, the principles of the invention may be exploited in other computer systems and environments as well. Accordingly, the embodiments described herein should be regarded as merely illustrative of the invention and should not be construed as limiting the scope of the invention.

What is claimed is:

1. A method comprising:
   a) tracking a current bus pipeline depth by a first bus agent of a plurality of bus agents coupled to a pipelined bus;
   b) comparing the current bus pipeline depth to a current maximum pipeline depth supported by the first bus agent; and
   c) asserting a signal on the pipelined bus to other bus agents of the plurality of bus agents to unilaterally and dynamically prevent the other bus agents from issuing transactions on the bus if the current bus pipeline depth is within a predetermined number of transactions of the current maximum pipeline depth supported by the first bus agent.

2. The method of claim 1, wherein the predetermined number of transactions is one transaction.

3. A computer system comprising:
   a bus operative to transmit pipelined bus transactions; and
   a plurality of agents coupled to the bus, each of the plurality of agents including,
      a transmitter operative to dynamically transmit an indication to the plurality of agents to prevent any of the plurality of agents from issuing a transaction on the bus if a current bus pipeline depth is within a predetermined number of transactions of a current maximum pipeline depth supported by the respective bus agent, and
      a receiver operative to receive the indication from another agent that none of the plurality of agents is to issue a transaction on the bus.

4. The computer system of claim 3, wherein the indication is a signal operative to be transmitted over a part of the bus.

5. The computer system of claim 3, wherein each of the plurality of agents further includes a bus state machine operative to indicate when the indication is to be transmitted, the bus state machine having a plurality of states.

6. The computer system of claim 5, wherein the plurality of states includes a free state, a throttled state, and a stalled state.

7. The computer system of claim 5, wherein the bus state machine is operative to transition directly from any one of the plurality of states to any other of the plurality of states.

8. The computer system of claim 7, wherein to which of the plurality of states the bus state machine transitions is responsive to how close the current bus pipeline depth is to the current maximum pipeline depth supported by the respective bus agent.

9. An apparatus comprising:
   means associated with a first bus agent for tracking a current bus pipeline depth, wherein a pipelined bus is operative to couple a plurality of bus agents;
   means associated with the first bus agent for comparing the current bus pipeline depth to a current maximum pipeline depth supported by the first bus agent; and
   means associated with the first bus agent for asserting a signal on the pipelined bus to other bus agents of the plurality of bus agents to unilaterally and dynamically prevent the other bus agents from issuing transactions on the bus if the current bus pipeline depth is within a predetermined number of transactions of the current maximum pipeline depth supported by the first bus agent.

10. An apparatus comprising:
    a controller associated with a first bus agent operative to track a current bus pipeline depth, wherein a pipelined bus is operative to couple a plurality of bus agents, and wherein the controller is operative to compare the current bus pipeline depth to a current maximum pipeline depth supported by the first bus agent; and
    a transmitter, coupled to the controller, operative to assert a signal on the pipelined bus to other bus agents of the plurality of bus agents to unilaterally and dynamically prevent the other bus agents from issuing transactions on the bus if the current bus pipeline depth is within a predetermined number of transactions of the current maximum pipeline depth supported by the first bus agent.

11. The apparatus of claim 10, wherein the predetermined number of transactions is one transaction.

* * * * *